United States Patent
Enevoldsen et al.

(10) Patent No.: US 8,123,480 B2
(45) Date of Patent: Feb. 28, 2012

(54) SENSOR SETUP FOR DETERMINATION OF DEFLECTION AND/OR STRAIN

(75) Inventors: Peder Bay Enevoldsen, Vejle (DK); Ib Frydendal, Føvling (DK)

(73) Assignee: Siemens Aktiengesellschaft, Munich (DE)

( * ) Notice: Subject to any disclaimer, the term of this patent is extended or adjusted under 35 U.S.C. 154(b) by 796 days.

(21) Appl. No.: 12/283,070

(22) Filed: Sep. 9, 2008

(65) Prior Publication Data
US 2009/0068014 A1 Mar. 12, 2009

(30) Foreign Application Priority Data
Sep. 12, 2007 (EP) .................................... 07017913

(51) Int. Cl.
*F03D 11/00* (2006.01)
(52) U.S. Cl. .......................... 416/61; 415/118
(58) Field of Classification Search .................. 416/61; 415/118
See application file for complete search history.

(56) References Cited

U.S. PATENT DOCUMENTS

| 4,297,076 A | 10/1981 | Donham et al. |
| 7,059,822 B2 | 6/2006 | LeMieux et al. |
| 2006/0000269 A1 | 1/2006 | LeMieux et al. |
| 2006/0201257 A1 | 9/2006 | Soechting et al. |
| 2008/0206057 A1* | 8/2008 | Twerdochlib ................ 416/190 |

FOREIGN PATENT DOCUMENTS
WO  WO 03029750 A1  4/2003
* cited by examiner

*Primary Examiner* — Alexander Ghyka

(57) ABSTRACT

An elongated member of a wind turbine is disclosed which is potentially subject to strain and which comprises a sensor unit for determining the deflection and/or strain of the elongated member between a first point and a second point, which are assigned to the same side of the elongated member, and the sensor unit comprises a proximity sensor for determining the distance between the second point and a third point, the third point being connected to the first point by an inflexible support, the distance between the first point and the third point being considerably longer than the distance between the second point and the third point, wherein the sensor unit comprises a compressible and/or stretchable element located between the second point and the third point. Moreover, a wind turbine rotor blade and a tower of a wind turbine, each comprising a previously described elongated member, are disclosed.

18 Claims, 2 Drawing Sheets

SENSOR SETUP FOR DETERMINATION OF DEFLECTION AND/OR STRAIN

CROSS REFERENCE TO RELATED APPLICATIONS

This application claims the benefits of European application No. 07017913.0 filed Sep. 12, 2007 and is incorporated by reference herein in its entirety.

FIELD OF INVENTION

The present invention relates to a device for deflection and/or strain measurement in elongated wind turbine elements like, for example, wind turbine rotor blades and wind turbine towers. The inventive deflection and/or measurement may be used for feedback to a cyclic pitch controller.

BACKGROUND OF THE INVENTION

In many aspects elongated members of wind turbines are exposed to stress that causes strain. For example, the tower of a wind turbine as well as the wind turbine rotor blades may be exposed by strong wind which causes a strain on the tower and the rotor blades. The load on the rotor blades and/or the tower may be reduced by a variation of the blade's pitch. This can be realised by individual pitch controllers in general or by a cyclic pitch controller.

An effective pitch control, for example for reducing the loads acting on the rotor, needs information about the load acting on the blade root which can be extracted from a determination of the rotor blade deflection. Optical fibres in the blades are typical sensors for a reliable and long term measurement of the rotor loads. Such systems are rather expensive.

In U.S. Pat. No. 7,059,822 B2 a method for determining a rotor blade deflection is disclosed wherein a rotor blade is coupled with a hub. The rotor blade includes a beam with a first end coupled to a baffle inside the rotor blade, while the second end of the beam is located adjacent to the hub and is used for measuring the deflection of the beam by means of at least one sensor located in the hub. The beam is located near the centreline of the rotor blade. The determination of the deflection of the blade is based on the movement of the beam which correlates with the blade deflection.

In WO 03/029750 A1 a sensor construction for measuring the bending of a construction element is disclosed. It comprises a rod element positioned offset relative to the deformation neutral line/surface for the bending to be measured. A first end of said rod element is firmly connected to the construction element and a second end of said rod element is connected to the construction element. The second end connection provides a movability in the axial direction of the rod element. The measurement is performed by measuring the position of the second end of the rod element relative to the construction element.

In US 2006/0000269 A1 a method for determining rotor blade deflection is described, wherein a rotor blade is coupled to a hub. A first end of the a beam is coupled to the rotor blade. A second end of the beam is positioned adjacent the hub. The deflection of the beam is measured by use of at least one sensor. The deflection of the blade is determined based on the deflection of the beam.

In US 2006/0201257 A1 a gas turbine blade fatigue life evaluating method for qualitatively evaluating the fatigue life of a turbine blade is described. The gas turbine blade is to be within its fatigue life if the creep elongation strain in the longitudinal direction of the turbine blade is less than 0.5% of an initial length. Moreover, a gas turbine blade creep elongation strain measuring apparatus which comprises a first fixed end, a second fixed end and a dial gauge. A dimension in the longitudinal direction is stamped on the surface of a turbine blade.

SUMMARY OF INVENTION

It is an objective of the present invention to provide an advantageous elongated member of a wind turbine. It is another objective of the present invention to provide an advantageous wind turbine rotor blade. A final objective of the present invention is to provide an advantageous tower of a wind turbine.

The first objective is solved by an elongated member of a wind turbine. The second objective is solved by a wind turbine rotor blade and the third objective is solved by a tower of a wind turbine. The depending claims define further developments of the invention.

The inventive elongated member of a wind turbine is potentially subject to strain. It comprises a sensor unit for determining the deflection and/or strain of the elongated member between a first point and a second point, which are assigned to the same side of the elongated member. The sensor unit comprises a proximity sensor for determining the distance between the second point and a third point. The third point is connected to the first point by an inflexible or stiff support. The distance between the first point and the third point is considerably longer than the distance between the second point and the third point.

The sensor unit can comprise a compressible and/or stretchable element located between the second point and the third point.

The invention is based on the observation that an elongated member of a wind turbine deflects when it is affected by strain. Due to the deflection also the distance between two distant points of the affected elongated member changes. The changed distance can be used as a measure of the deflection and/or as a measure of the strain.

The use of an inflexible support has the advantage that only a relatively small distance between the second point and a third point needs to be measured when the distance between the first and second point changes since the third point has a fixed and known relationship to the first point due to the inflexible support. The relatively small distance to be measured increases the accuracy and the robustness of the determination of the deflection and/or the strain.

The determination or measurement of the distance between the second and third points can especially be done by means of an acoustic, magnetic, electromagnetic, capacitive or inductive measurement. Preferably, the distance between the second point and the third point can be determined by means of a laser range sensor.

In order to further increase the accuracy in determining the deflection and/or strain of the elongated member of the wind turbine the method can be performed at least two sides of the elongated member. The sides can be perpendicular or parallel and/or opposite to each other. Then the distance between second points and third points which are assigned to a same side of the elongated member may be separately determined for each of the sides.

For example, the determination of the distance at two parallel and opposite sides of the elongated member which is subject to bending provides two different results, which represent compression and stretch. At one side, the distance between two distant points, i.e. the first and the second point, assigned to this side decreases compared to the distance between these points when the elongated member is not subject to bending. The decreased distance is due to a compression of this side. Because of the inflexible or stiff support between the first point and a third point, the decreased distance can be measured with high accuracy between the second and the third point. At the second side, the distance between two distant points, i.e. the first and the second point, assigned to this side increases due to a stretch of this side. This increased distance can be measured between the second and the third point assigned to this side.

Furthermore, the distance can be determined at sides which run perpendicular to each other. This provides information about the deflection in perpendicular directions. Of course, to increase the accuracy the distance at two or more parallel and at two or more opposite sides of the affected elongated member can be measured to determine deflection and/or the strain in each direction.

The described method can preferably be applied to wind turbine rotor blades or wind turbine towers. In the case of an application in a wind rotor blade the results regarding the deflection and the strain acting on the rotor blade may be used as feedback for cyclic pitch control or for individual pitch control in general. Individual pitch control denotes pitch control where the blades are pitched more or less independently of each other. Pitch control schemes are often used to reduce the loads acting on the blades and hence the resulting deflections and strains.

The sensor may be located at the second point or at the third point. Moreover, the compressible and/or stretchable element may comprise a hollow space extending from the second point to the third point. This makes it possible to measure the distance inside the hollow space which reduces environmental influences. The compressible and/or stretchable element may, for example, be a rubber support or a telescope unit. If the support is designed as a telescope it is advantageous when the telescope has low friction.

The proximity sensor can, for example, be an acoustic sensor, a magnetic sensor, an electromagnetic sensor, a capacitive sensor or an inductive field effect sensor. Preferably, the proximity sensor can be a laser range sensor.

The inventive wind turbine rotor blade comprises an inventive elongated member as previously described. Advantageously, the elongated member can comprise at least two sensor units. The at least two sensor units can be arranged such that their inflexible supports extend parallel to each other at different sides of the elongated member. Alternatively or additionally, sensor units can also be arranged such that their inflexible supports extend perpendicular to each other. The rotor blade may comprise a blade root and a shoulder and the sensor unit can preferably be located between the blade root and the shoulder. A positioning of the sensor unit near the blade root is advantageous because the moment due to the bending is mainly acting at the rotor blade near the blade root.

The sensor unit can generally be applied in connection with cyclic pitch control and for individual pitch controllers. Individual pitch control denotes pitch control where the blades are pitched more or less independently of each other. Moreover, the determination of the deflection and/or the strain induced to the blade root may provide accuracy in blade root sidewise moment signals that makes stall detection, based on lift/drag calculation, possible.

The inventive tower of a wind turbine comprises an inventive elongated member as previously described. Preferably the inventive elongated member of the wind turbine tower with the sensor unit is located near the tower bottom or near the tower top. What was said with respect to parallel and perpendicular extension of the inflexible support members of two or more sensor units in wind turbine blades is also applicable to wind turbine towers.

As the deflection and/or the strain is determined by means of any of the inventive devices, the obtained result has the lowing qualities: the measurement is significantly more robust regarding local geometry. Furthermore, the measurement is more robust due to large dynamic range in the proximity measurement.

BRIEF DESCRIPTION OF THE DRAWINGS

Further features, properties and advantages of the present invention will become clear from the following description of an embodiment in conjunction with the accompanying drawings.

DETAILED DESCRIPTION OF INVENTION

Figure 1:
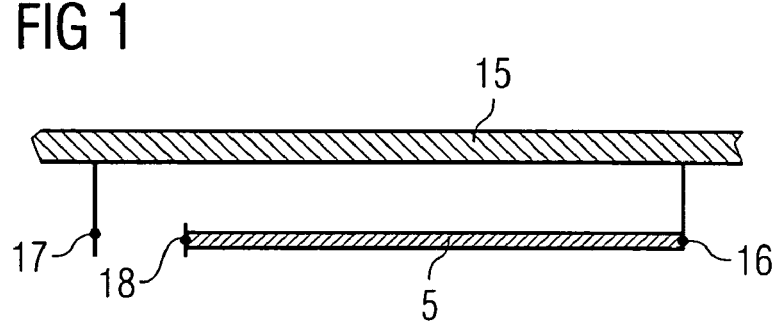
FIG. 1 schematically shows an elongated member of a wind turbine which is not deflected in a sectional view.

An embodiment of the present invention will now be described with reference to FIGS. 1 to 4. At first, the general principle or the idea of the invention will be explained with reference to FIG. 1. FIG. 1 schematically shows an elongated member of a wind turbine 15 which is not deflected in a sectional view. The elongated member 15 comprises two distant points, a first point 16 and a second point 17. It further comprises a third point 18 which is connected to the first point 16 by means of an elongated inflexible or stiff support 5, for example a stiff rod. In FIG. 1 the inflexible support 5 extends parallel to the elongated member 15. Moreover, the third point 18 is located between the first point 16 and the second point 17. The distance between the first point 16 and the third point 18 is much longer than the distance between the second point 17 and the third point 18.

In case of a deflection of the elongated member 15, the distance between the first point 16 and the second point 17 changes and therefore also the distance between the second point 17 and the third point 18 changes. To determine the deflection the distance between the second point 17 and the third point 18 can be determined or measured, preferably by a laser range sensor or any other proximity gage. The used proximity sensor can be located at the second point 17 or at the third point 18. With the invention, only the relatively small distance between the second point 17 and the third point 18 has to be determined, which increases the accuracy of the measurement.

Figure 2:
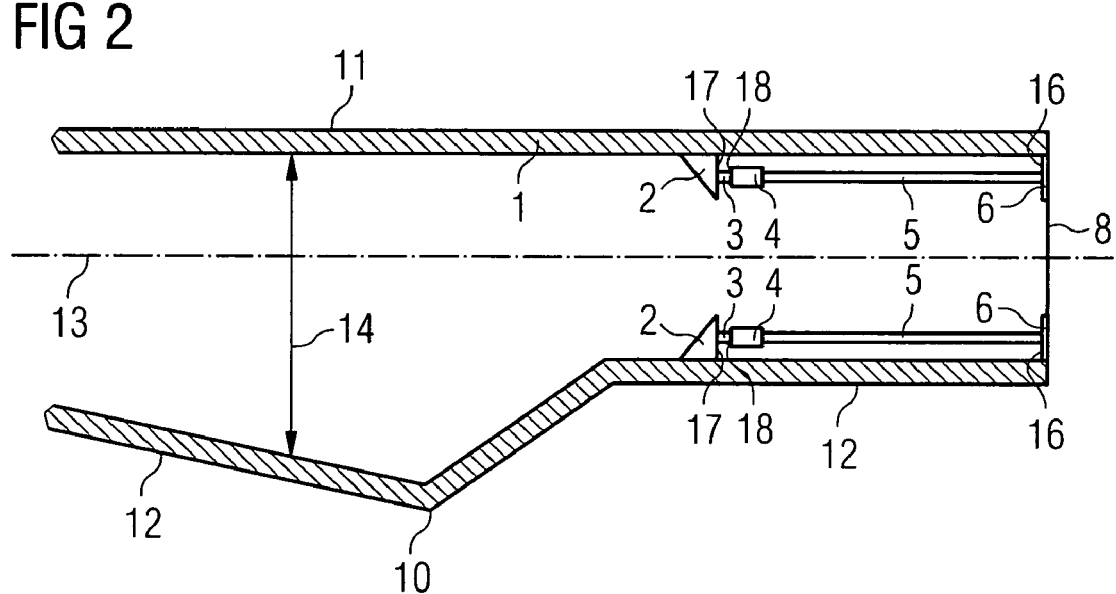
FIG. 2 schematically shows a part of a wind turbine rotor blade in a sectional view.

FIG. 2 schematically shows a part of the wind turbine rotor blade 1 in a sectional view. The rotor blade 1 comprises a blade root 8, a leading edge 11, a trailing edge 12 and a shoulder 10 which is the point of the blade's greatest width. The blade 1 is typically mounted to a rotor hub at the blade root 8. The centreline 13 (also called span) of the rotor blade 1 extend from the centre of the blade root 8 to the tip of the blade which is not shown in FIG. 2. The so called chord 14 characterises the width of the blade 1 perpendicular to the centreline 13. The region where the chord 14 reaches its highest value is called the shoulder 10 of the blade 1, i.e. the location of the blade's greatest width. The trailing edge 12 connects the blade root 8 via the shoulder 10 to the tip of the blade 1. The leading edge 11 is the side which connects the blade root 8 to the tip and extends opposite the trailing edge 12 as seen in a chordwise direction.

The wind turbine blade 1 is hollow inside. It further comprises two sensor units inside its hollow body for determining the deflection of the blade 1. One sensor unit is mounted with the stiff support 5 extending along the leading edge 11 near the blade root 8 while the other sensor unit is mounted with the stiff support 5 extending along the trailing edge 12 near the blade root 8.

Each sensor unit for the determination of the deflection near the blade root 8 comprises an inflexible or stiff support 5, a proximity sensor 4, a compressible element 3 and a reference fitting 2. The reference fitting 2 comprises the second point 17. One end of the inflexible support 5 is fixed to the blade root 8 by a fixation 6 on which the first point 16 is located. The proximity sensor 4 is mounted to the other end of the inflexible support 5 and provides the third point 18. The proximity sensor 4 is further connected to the reference fitting 2 via the compressible and/or stretchable element 3, which is, in the present embodiment, a rubber support in form of a rubber sleeve. Alternatively, the proximity sensor 4 may be mounted to the reference fitting 2 and may provide the second point 17. The third point 18 would then be provided by the loose end of the inflexible support 5.

In the present embodiment the sensor 4 is a proximity gage, for instance a laser range sensor. Generally, the proximity measurement may be based on acoustic, magnetic, electromagnetic, capacitive or inductive field effects. The proximity sensor 4 in the present embodiment measures or determines the distance between the proximity sensor 4, which defines the third point 18, and the reference fitting 2, which defines the second point 17.

In conjunction with the known length of the inflexible support 5 the measured distance between the proximity sensor 4 and the reference fitting 2 can be used to provide a measure for, or to determine, the distance between the second point 17 and the first point 16, which corresponds to the difference between the reference fitting 2 and the fixation 6 of the inflexible support 5 to the blade root 8. This means that the distance between two distant points, namely the first point 16 and the second point 17, is determined and provides information about the deflection of the elongated member between these two points.

When no deflection occurs, the inflexible support 5 of one sensor unit of the two sensor units is parallel to the leading edge 11 and the inflexible support 5 of the other sensor unit of the two sensor units is parallel to the trailing edge 12. In the present embodiment the leading edge 11 and the trailing edge 12 are parallel to each other near the blade root 8. In the case of a deflection of the turbine blade, the leading edge 11 and the trailing edge 12 deflect. This results in a change of distance between the reference fitting 2 and the fixation 6 of the respective sensor unit. For instance, the distance between the first point 16 and the second point 17 of the sensor unit which is parallel to the leading edge 11 increases and the distance between the first point 16 and the second point 17 of the sensor unit which is parallel to the trailing edge 12 decreases when the rotor blade is deflected towards the trailing edge.

Due of the fact that the distance between the proximity sensor 4 and the fixation 6, which is the distance between the second point 17 and the first point 16, cannot change because of the inflexibleness of the inflexible support 5, the changed distance between the fixation 6 and the reference fitting 2 occurs as a change of the distance between the proximity sensor 4 and the reference fitting 2, which is the distance between the second point 17 and the third point 18. This changed distance is measured by the proximity sensor 4 and can be used to determine the deflection of the rotor blade 1 and/or the strain acting on the rotor blade 1.

Figure 3:
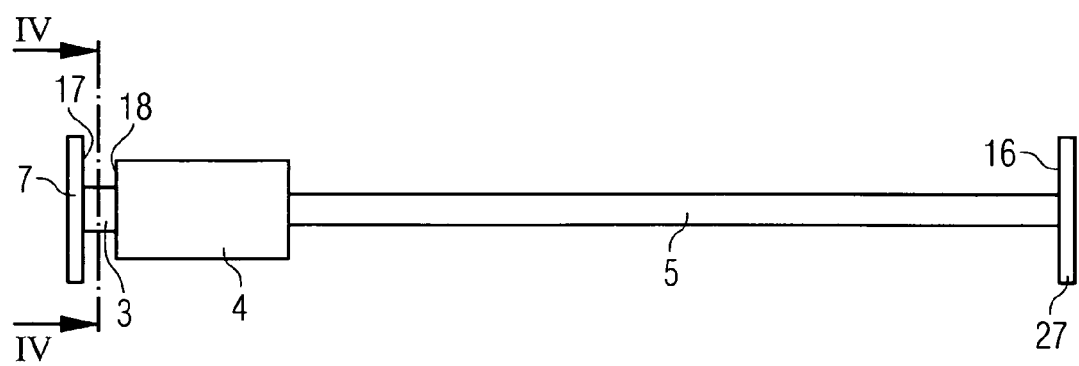
FIG. 3 schematically shows the sensor unit.

FIG. 3 schematically shows one of the sensor units. The sensor unit comprises two mounting brackets 7, 27 an inflexible support 5, a sensor 4 and a rubber sleeve as a compressible and/or stretchable element 3. The left mounting bracket 7 in FIG. 3 can be used to fix the sensor unit to the reference fitting 2 and provides the second point 17. The right mounting bracket 27 in FIG. 3 can be used to mount the sensor unit to the fixation 6 and provides the first point 16. Alternatively, the right mounting bracket 27 may be fixed to the reference fitting 2 and the left mounting bracket 7 to the fixation 6, which would locate the sensor 4 close to the blade root 8.

One end of the inflexible support 5 is fixed to the right mounting bracket 27, which corresponds to the first point 16. The proximity sensor 4, which is a laser range sensor in the present embodiment, is mounted to the other end of the inflexible support 5 and provides the third point 18. In FIG. 3 the rubber sleeve 3 is placed between the proximity sensor 4 and the left mounting bracket 7, which corresponds to the second point 17. Instead of a rubber sleeve a different rubber support or a telescope unit with low friction may be used as well.

Figure 4:
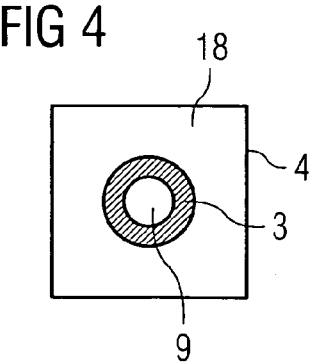
FIG. 4 schematically shows a view along the direction IV-IV in FIG. 3.

A sectional view along the direction indicated by line IV-IV in FIG. 3 is shown in FIG. 4. FIG. 4 schematically shows the cross-section of the rubber sleeve 3 of the present embodiment. The rubber sleeve 3 has a circular cross-section with a hollow space 9 in its centre. One can further see in the background of FIG. 4 the proximity sensor 4 and the corresponding third point 18, which is schematically represented by a surface of the proximity sensor 4. Advantageously, the proximity measurement is performed inside the hollow space 9 of the compressible element 3. This allows an undisturbed measurement by avoiding environmental influences.

Generally the number of used sensor units can vary depending on the characteristics of the deflection or the strain which shall be measured. In the present embodiment the sensor setup measures edge-wise strains which allow for determining edge-wise moments. Furthermore, flap-wise moments can be measured by similar sensor units rotated by 90°, for example parallel to the chord 14. If sensor units in both orientations are present, this would provide a means for determining moments about two axes. Of course, it is also possible to use only one sensor unit for determining the deflection and/or the strain and/or the moments about each axis.

The described sensor unit may also be applied to other parts of a wind turbine rotor blade or to the tower of a wind turbine, for instance at the tower bottom or the tower top.

Compared to the cited state of the art the present invention provides a cheap possibility to determine the deflection and/or the strain of an elongated member of a wind turbine because the described sensor unit can easily be mounted at each desired position. Furthermore, the present invention allows for measurements with a very high accuracy because, in contrast to the cited state of the art, the deflection or the strain is determined where the deflection or the strain occurs, that is in the vicinity of a side of the elongated member which is subject to strain and not near the centreline of a hollow body of the elongated member as it is proposed in U.S. Pat. No. 7,059,822 B2.

The invention claimed is:

1. An elongated member of a wind turbine subjected to strain, comprising:
   a sensor unit for determining a deflection and/or a strain of the elongated member between a first point and a second point where the first and second points are assigned to a same side of the elongated member, the sensor unit having a proximity sensor for determining a distance between the second point and a third point, wherein the third point is connected to the first point by an inflexible support configured not to deflect when the elongated member deflects, the inflexible support thereby effective to maintain a constant distance between a first point and the third point, the distance between the first point and the third point is considerably longer than the distance between the second point and the third point, the third point is connected to the second point by a hollow, elastic element, and the distance between the second point and the third point is measured within the elastic element.

2. The elongated member as claimed in claim 1, wherein the proximity sensor is located at the second point or at the third point.

3. The elongated member as claimed in claim 2, wherein the elastic element comprises a hollow space extending from the second point to the third point.

4. The elongated member as claimed in claim 3, wherein the elastic element comprises a rubber support.

5. The elongated member as claimed in any of the claim 4, wherein the proximity sensor is selected from the group consisting of: an acoustic sensor, a magnetic sensor, an electromagnetic sensor, a capacitive sensor and an inductive field effects sensor.

6. The elongated member as claimed in claim 5, wherein the proximity sensor is a laser range sensor.

7. A wind turbine rotor blade, comprising:
a blade root;
a leading edge extending away from the blade root along a centerline that is perpendicular to the blade root;
a trailing edge opposite the leading edge and extending away from the blade root, wherein
the leading edge and the trailing edges together form a hollow blade body, and
a shoulder of the blade body resides at a maximum width location between the leading and trailing edges of the blade body; and
a sensor unit arranged inside the hollow blade body where the sensor unit determines a deflection of the rotor blade between a first point and a second point of the rotor blade where the first and second points are assigned to a same side of the rotor blade, the sensor unit having a proximity sensor for determining a distance between the second point and a third point, wherein
the third point is connected to the first point by an inflexible support configured not to deflect when the rotor blade deflects, the inflexible support thereby effective to maintain a constant distance between a first point and the third point and the distance between the first point and the third point is considerably longer than the distance between the second point and the third point, and the third point is connected to the second point by a hollow, elastic element configured to enclose the distance between the second point and the third point.

8. The wind turbine rotor blade as claimed in claim 7, wherein the rotor blade comprises a plurality of sensor units.

9. The wind turbine rotor blade as claimed in claim 8, wherein two sensor units are arranged such that their inflexible supports extend parallel to each other at different sides of the elongated member.

10. The wind turbine rotor blade as claimed in claim 9, wherein two sensor units are arranged such that their inflexible supports extend perpendicular to each other.

11. The wind turbine rotor blade as claimed in claim 8, wherein the sensor unit is located between the blade root and the shoulder.

12. A tower of a wind turbine, comprising:
a tower bottom portion;
a tower top portion; and
an elongated tower section that connects the top and bottom portions, wherein the elongated tower section comprises:
a sensor unit for determining the deflection of the elongated tower section between a first point and a second point where the first and second points are assigned to a same side of the elongated tower section, the sensor unit having a proximity sensor for determining a distance between the second point and a third point, where
the third point is connected to the first point by an inflexible support configured not to deflect when the elongated member deflects, the inflexible support thereby effective to maintain a constant distance between a first point and the third point, and a distance between the first point and the third point is considerably longer than the distance between the second point and the third point, and
the third point is connected to the second point by a hollow, elastic element disposed inside of which is the measured distance between the second point and a third point.

13. The tower as claimed in claim 12, wherein the proximity sensor is located at the second point or at the third point.

14. The tower as claimed in claim 13, wherein the elastic element comprises a hollow space extending from the second point to the third point.

15. The elongated member as claimed in claim 14, wherein the elastic element comprises a rubber support.

16. The elongated member as claimed in any of the claim 15, wherein the proximity sensor is selected from the group consisting of: an acoustic sensor, a magnetic sensor, an electromagnetic sensor, a capacitive sensor and an inductive field effects sensor.

17. The elongated member as claimed in claim 16, wherein the proximity sensor is a laser range sensor.

18. The wind turbine rotor blade as claimed in claim 7, wherein the first point is disposed on the blade root adjacent a rotor hub.

* * * * *